Nov. 4, 1941.　　　F. M. ARCHIBALD　　　2,261,206
WHITE OIL REFINING
Filed Dec. 30, 1939
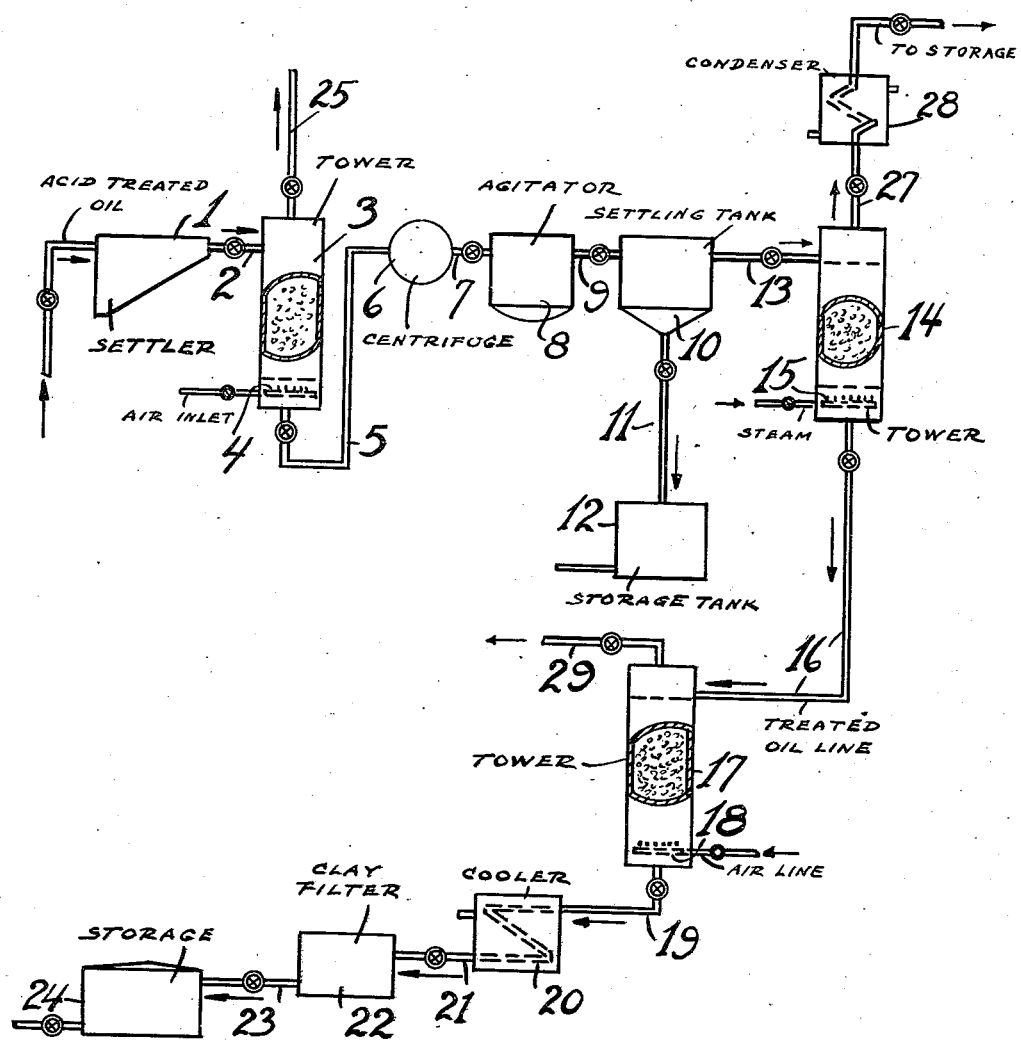

Patented Nov. 4, 1941

2,261,206

UNITED STATES PATENT OFFICE 2,261,206

WHITE OIL REFINING

Francis M. Archibald, Elizabeth, N. J., assignor to Standard Oil Development Company, a corporation of Delaware Application December 30, 1939, Serial No. 311,906

5 Claims. (Cl. 196—40)

This invention relates to an improved process for the preparation of white oil petroleum products, especially with regard to effecting an improvement in the stability of the products. The invention is concerned with the preparation of medicinal white oils, turbine oils, body oils and various textile oils.

An object of the invention is the preparation of white oil products by a process requiring smaller amounts of chemical and physical refining agents than at present employed in the industry.

Another object of the invention is the preparation of products of improved stability with regard to color, chemical deterioration and copper corrosion.

Other objects of the invention will be apparent from the following description.

White oil products are usually prepared from petroleum distillates of lubricating oil range by exhaustive treatment with sulfuric acid. By exhaustive treatment with sulfuric acid is meant the treatment with concentrated or fuming sulfuric acid with volumes relative to the oil of between 20% and 55%. The oil after this treatment is usually settled for between 4 and 24 hours, the lower layer of heavy sludge is separated and the supernatant oil volume passed to centrifuges where the finely suspended "pepper" sludge is removed. The oil is then often air blown for 2 to 8 hours to remove attendant sulfur dioxide in order to reduce the amount of alkali required to neutralize the oil. The oil is neutralized with a dilute aqueous alcoholic alkali solution and then washed with an aqueous alcohol solution. The oil after this treatment is usually steamed, brightened and then clay treated.

In the process of the present invention the acid treated oil after the separation of the heavy sludge, as a layer in batch operation or by preliminary centrifuging in continuous operation, is air blown. The oil is then passed to the centrifuges. The material separated in this centrifuging operation contains in addition to the usual "pepper" sludge, a material solubilized by the presence of sulfur dioxide, also decomposed sulfated and sulfonated material and also the easily oxidized sludge material formed during the air blowing operation. The air blowing is suitably effected by a counter-current air treatment in a packet or bubble plate column; or it may be conveniently carried out by passing in a stream of air during the centrifuging operation in a suitably designed type of centrifuge.

The oil after centrifuging is washed with an aqueous alcoholic solution containing alkali, then steamed and air blown to remove alcohol and moisture and finished if necessary by clay treating. The neutralizing solution consists of either sodium hydroxide or sodium carbonate in about 10% concentration in a 50-50 water-alcohol mixture. The alcohol employed may be methyl, ethyl, isopropyl or tertiary butyl, but usually isopropyl alcohol is employed because of its convenient boiling point and low latent heat and its ready availability.

The air treatment of the oil after separation of the heavy sludge can be carried out with air containing a controlled moisture content. The moisture content in the air blowing operation can easily be controlled by saturating the air with water vapor at a definite temperature and pressure previous to contacting with the oil. Moist air treatment of acid oils has been found to render the "pepper" sludge less soluble because of hydration and hydrolysis of the sludge and it also inhibits the breakdown of the sludge during precipitation in the oil. Decreasing the solubility of the sludge in the oil and minimizing the release of oil soluble sludge decomposition material, are particular features of the invention. It has been found that air blowing before centrifuging removes not only sulfur dioxide in solution and as a decomposition product of sludge material but effects other changes in the oil, apparently connected with reactions involving sulfo compounds in the oil with the result that much of this material is precipitated usually as dark colored globules.

In order to obtain a finished oil of superior quality it is preferable to blow the oil with a relatively large volume of air and to carry out the blowing rapidly, and then to remove the precipitate as rapidly as possible. In order to carry out the process in its preferable embodiment it is usual to employ counter-current air treatment in a packed or bubble plate column and passing the treated oil immediately to the centrifuges. When convenient equipment is available it is advisable to combine the air treatment with the centrifuging operation. Oil insoluble solvents for sludge may be added to the oil at the time of the air blowing in order to increase the amount of material separated.

The accompanying drawing shows one embodiment of the apparatus for carrying out the process.

As an example of the process, a lubricating oil distillate having a viscosity of 90-100 seconds Saybolt at 100° F. from a Mid-Continent crude was treated at the rate of 390 gallons per hour with 35% by volume of 20% fuming sulfuric acid. This acid treated oil containing about 15% sludge was passed into a settler 1. After settling for about 4 hours the supernatant oil layer containing about 2% "pepper" sludge was passed through line 2 to the tower 3 of about 2' diameter. The tower 3 was packed with 1" Raschig rings. The temperature of the tower was maintained at 35° C. At the base of the tower air was blown continuously through the sprayer 4 at the rate of 3000 cu. ft./hr., that is, air blowing at the rate of 80 cu. ft. of air per gallon of oil. From the base of the tower the treated oil containing about 2.5% of sludge was passed by line 5 to the centrifuges 6. The clarified oil was then passed through line 7 to an agitator 8 where it was treated with a 10% aqueous alcoholic sodium carbonate solution. The resultant mixture was then passed through line 9 to the settling tank 10. The lower aqueous layer was separated by line 11 and passed to storage tank 12. The oil layer was passed by means of line 13 to the tower 14 of about 2' diameter and packed with Raschig rings. At the base of the tower steam was blown upwards continuously through the sprayer 15 at the rate of 2 to 4 lbs. of steam per gallon of oil. The temperature at the base of the tower was maintained at about 140° C. The treated oil passed out from the bottom of the tower 14 by the line 16 to a second tower 17 of similar dimensions and packed with Raschig rings. From a sprayer 18 air passed continuously at the rate of 3000 cu. ft./hr. (atmospheric pressure) upwards through the tower. The treated oil passed by a line 19 to the cooler 20 wherein the temperature of the oil was reduced to 60° C. The oil then passed by a line 21 to the clay filters 22 and subsequently through line 23 to storage tank 24. The exit from tower 3, namely line 25 was connected to a flue and the material washed with water prior to passing to the sewer. The exhaust 27 from the tower 14 passed to a condenser 28 to recover the dilute alcohol for further use. Exhaust 29 from the tower 17 was vented to the air.

The quality of the products obtained by the process of the present invention is suitably evaluated by the following color test data. A lubricating oil distillate derived from a Coastal crude and of viscosity 340 seconds Saybolt Universal at 100° F. was treated with 20% fuming sulfuric acid in the amount of 45% by volume. The acid oil mixture was allowed to settle for 1½ hours and the heavy sludge separated. Three samples of the resultant oil layer were taken. The first sample was air blown for four hours. The oil layer was neutralized with a slight excess of a 50–50 water isopropyl alcohol solution containing 10% sodium carbonate and the oil then washed with two volumes of 50–50 water-isopropyl alcohol solution. The oil was then steamed to remove the dissolved alcohol and allowed to cool. The color upon the product was +17 Saybolt. The second sample of oil was centrifuged to zero sludge and the thus clarified oil then air blown for four hours and neutralized with a slight excess of a 50–50 water-isopropyl alcohol solution containing 10% sodium carbonate and washed as above. The oil layer was separated and steamed to remove the dissolved isopropyl alcohol and then allowed to cool. The color upon the product was +20 Saybolt. The third sample of oil was air blown for four hours and then centrifuged to zero sludge. The thus clarified oil was then neutralized with a slight excess of a 50–50 water-isopropyl alcohol solution containing 10% sodium carbonate. The oil layer was separated and steamed to remove alcohol and then allowed to cool. The color upon the product was +24 Saybolt.

The data obtained upon the quality of the three oil samples show that: (1) a low color was obtained upon the oil which had been refined by air blowing the acid oil followed by neutralizing the oil; (Example 1); (2) that an improved color was obtained by removing the sludge as much as possible from the oil before air blowing and then neutralizing; (Example 2); and (3) that a still further improvement in color of the refined oil was obtained by air blowing the oil containing finely divided sludge, then centrifuging to separate the combined sludge (due to acid and air blowing) and then neutralizing; (Example 3). It is apparent that this marked color improvement is due to the removal from the oil of materials of poor color which are also sufficiently unstable, chemically and physically, to be affected by air blowing and thus permit their separation by subsequent centrifuging and neutralizing of the oil.

The advantage of obtaining high color can be seen from the fact that a technical white oil of 24 Saybolt color was obtained by the technique of this invention after using only 45% of acid and without clay percolation. To obtain this color by the usual technique for finishing acid oil it was necessary to use 55% of acid.

In making U. S. P. white oil the amount of acid used is generally determined by the U. S. Pharmacopoeia hot acid test on the finished and clay treated oil. The technique of this invention improves the color and quality of the neutral oil to be clay treated with a resultant improvement in filter yield. For example, neutral oil of 24 Saybolt color gave a 10% better filter yield than oil of 20 Saybolt color.

This invention is not to be limited to the specific embodiments shown or the specific examples given nor to any theories advanced as to the operation of the invention, but in the appended claims it is intended to claim all inherent novelty in the invention.

I claim:

1. A process for preparing mineral white oils comprising exhaustively treating petroleum oils of about lubricating oil range with concentrated sulfuric acid, separating the resulting heavy sludge from the oil layer which contains finely suspended sludge, then blowing the said oil layer with air, separating from the oil the sludge material formed during said air blowing, neutralizing the thus clarified oil with an alcoholic alkali solution, removing the alcoholic layer, and drying the oil.

2. A process for preparing mineral white oils comprising exhaustively treating petroleum oils of about lubricating oil range with concentrated sulfuric acid; separating the resulting heavy sludge from the oil layer which contains finely suspended sludge, then blowing the said oil layer with air, then centrifuging the oil to separate the sludge material formed during the said air blowing, neutralizing the thus clarified oil with an aqueous alcoholic alkali solution, separating the aqueous alcoholic layer, passing steam through the oil to remove traces of alcohol and air blowing the oil to remove moisture.

3. A process for preparing mineral white oils comprising exhaustively treating petroleum oils of about lubricating oil range with concentrated sulfuric acid; separating the resulting heavy sludge from the oil layer which contains finely suspended sludge, then blowing the said oil layer with a counter-current stream of air in a packed column, then centrifuging the oil to separate the sludge material formed during said air blowing, neutralizing the thus clarified oil with an aqueous alcoholic alkali solution, separating the aqueous alcoholic layer, passing steam through the oil to remove traces of alcohol, air blowing the oil to remove moisture and finishing the oil by clay treating.

4. A process for preparing mineral white oils comprising exhaustively treating petroleum oils of about lubricating oil range with concentrated sulfuric acid, separating the resulting heavy sludge from the oil layer which contains finely suspended sludge, then blowing the said oil with a counter-current stream of air containing a small amount of moisture in a packed column, then centrifuging the oil to separate the sludge material formed during said air blowing, neutralizing the thus clarified oil with an aqueous alcoholic alkali solution, separating the aqueous alcoholic layer, passing steam through the oil in a packed column to remove traces of alcohol, air blowing the oil to remove moisture and finishing the oil by clay treating.

5. A process for preparing mineral white oils comprising exhaustively treating petroleum oils of about lubricating oil range with concentrated sulfuric acid, separating the resulting heavy sludge from the oil layer which contains finely suspended sludge, then blowing the said oil with a counter-current stream of air containing a small amount of moisture in a packed column, at a temperature of 35° C., then centrifuging the oil to separate the sludge material formed during said air blowing, neutralizing the thus clarified oil with an aqueous alcoholic alkali solution, separating the aqueous alcoholic layer, passing steam through the oil in a packed column to remove traces of alcohol, air blowing the oil to remove moisture and finishing the oil by clay treating.

FRANCIS M. ARCHIBALD.